Nov. 30, 1965     R. A. SHEARER ETAL     3,221,249
FREQUENCY MEASURING APPARATUS INCLUDING DUAL RECTIFIER
MEANS AND TRANSISTOR TRANSLATING MEANS
Original Filed April 3, 1959
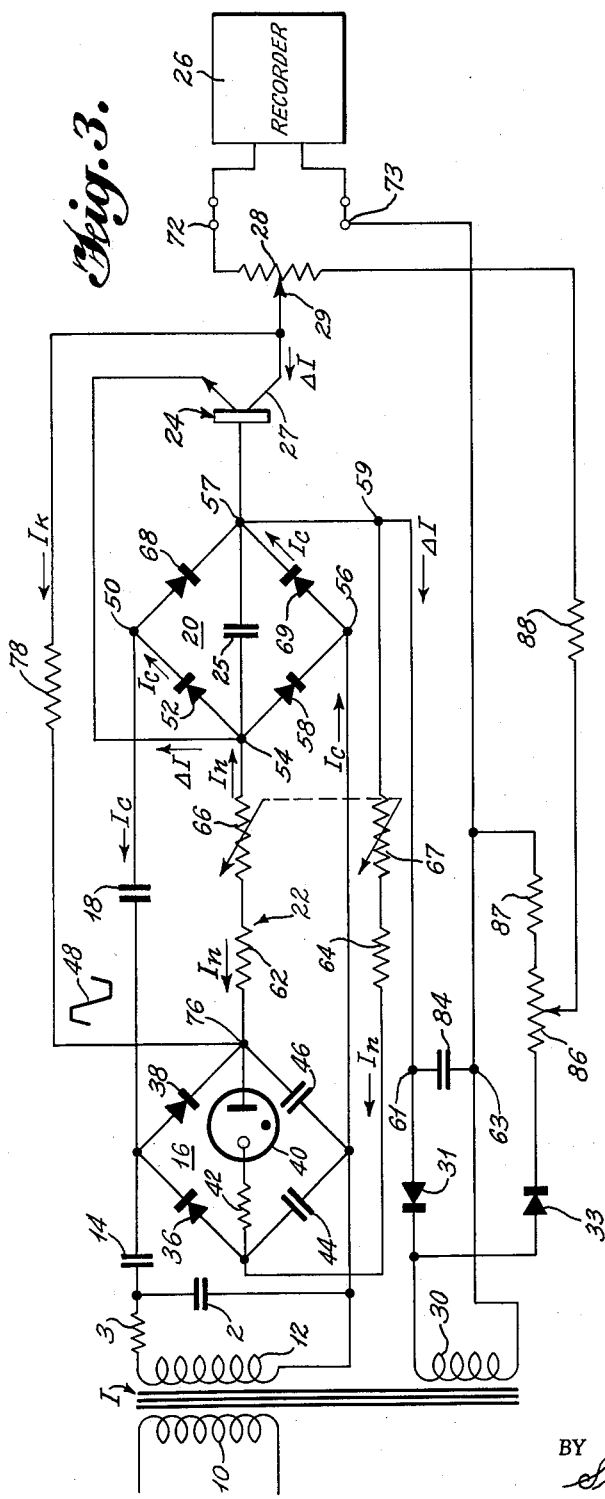
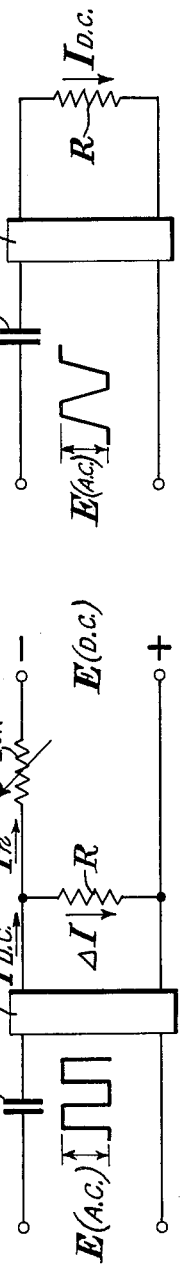
INVENTORS
*David W. Spence*
*& Robert A. Shearer*
BY
*Stevens, Davis, Miller & Mosher*
ATTORNEYS

United States Patent Office 3,221,249
Patented Nov. 30, 1965

3,221,249
FREQUENCY MEASURING APPARATUS INCLUDING DUAL RECTIFIER MEANS AND TRANSISTOR TRANSLATING MEANS
Robert A. Shearer and David W. Spence, Houston, Tex., assignors to Texas Instruments Incorporated, Dallas, Tex., a corporation of Delaware
Continuation of application Ser. No. 803,960, Apr. 3, 1959. This application July 19, 1962, Ser. No. 211,045
2 Claims. (Cl. 324—78)

This invention relates to a frequency transducer and more particularly to an improved null-type frequency transducer for use with a high impedance galvanometric recording device.

This is a continuation application of the application Serial No. 803,960 filed April 3, 1959, now abandoned, for an improvement in a Frequency Transducer by Robert A. Shearer and David W. Spence and assigned to the same assignee as this application.

Since there is a need for accurate devices monitoring the frequency of alternating current power sources used with various types of electrical apparatus, the principal object of this invention is to provide an improved frequency transducer having an expanded scale for producing a direct current output signal proportional to the frequency of an alternating current signal applied to the input of the transducer.

According to this invention, an input signal is applied to a circuit including a voltage limiter, a throttling capacitor, and a rectifier to derive a rectified capacitor current proportional to the frequency of the input signal. The current so derived is then fed to an indicator, such as a graphic recorder. Prior to this invention, frequency transducers which make use of a voltage limiter, a differentiating capacitor, and a rectifier were generally known. The present invention improves on these prior art circuits by avoiding the use of differentiation and the consequent necessity for carefully shaping the leading edge of a waveform, and by providing a null or bucking current from the same voltage reference that provides the voltage limiting for the throttling capacitor. The bucking current being derived from the voltage limiter in this manner, the effect of changes in voltage output from the voltage limiter are effectively minimized. Another feature of this invention is the provision of a signal translating means for coupling the difference signal from a low impedance frequency transducer to a high impedance load.

Further objects and advantages will become apparent as the following detailed description of a preferred embodiment unfolds and when read in conjunction with the appended claims and attached drawing in which:

FIGURE 1 is a schematic diagram of a circuit useful for illustrating the theory of operation of a frequency transducer;

FIGURE 2 is a schematic diagram of a circuit useful in the analysis of a frequency transducer including a nulling circuit; and FIGURE 3 is a circuit diagram of a frequency transducer embodying this invention.

FIGURE 1 shows a circuit comprising a capacitor C, a full wave rectifier 7 and resistance R connected across an alternating current voltage $E_{AC}$. This voltage has a peak-to-peak amplitude limited to a constant value, E. It can be shown that the full wave rectified current, $I_{DC}$, is directly proportional to the peak-to-peak voltage E times the frequency for any broad-topped wave. However, an accurate proportionality is obtained only when the time constant RC is very small with respect to the inverse of the frequency, $1/f$, where the frequency $f$ is in cycles per second. Under these conditions, the following equation holds true:

$$I_{DC} = 2CfE$$

It can therefore be seen that if the peak-to-peak voltage E is maintained constant, the rectified capacitor current $I_{DC}$ flowing through resistor R is directly proportional to the frequency of the input signal $E_{AC}$. However, for RC to be mathematically negligible with respect to $1/f$, it can be shown that R must be very small. This becomes a problem in many applications, since R is often the resistance of a recorder or similar device.

FIGURE 2 is another schematic diagram useful in the analysis of the operation of a frequency transducer, incorporating a nulling or bucking circuit for providing zero suppressed operation.

In FIGURE 2, $E_{AC}$ again represents a limited alternating current input signal which is applied to a throttling capacitor C and a full-wave rectifier 9 for developing a rectified current $I_{DC}$ proportional to the frequency of the input signal. Resistor R represents the resistance of a metering device. The direct current voltage $E_{DC}$ provides a null current $I_n$ which bucks the capacitor current $I_{DC}$ so that only a difference current $\Delta I$ flows through the resistance R. Adjustable resistor $R_n$ is for the purpose of varying the value of the null current $I_n$, thereby providing for adjustment of the value of difference current $\Delta I$ flowing through resistor R.

To obtain narrow bandwidth operation, e.g., 375 cps. to 425 cps. a rather large nulling current is required to provide a net 0 to 1.0 ma. value for $\Delta I$ flowing through the resistor R in this range of frequencies. The value of this nulling current would be approximately 7.5 ma. at 375 cps.

An analysis of the circuit shown in FIGURE 2 follows. It can be seen that if R is short-circuited, then $I_{DC} = 2CfE$ and $I_n = E/R_n$ and $$\Delta I = I_{DC} - I_n = E(2CfR_n - 1)/R_n$$

However, if R is not short-circuited, then:

$$I_{DC} = 2Cf(E - \Delta IR)$$
$$I_n = (E + \Delta IR)/R_n$$

Where
$$\Delta I = I_{DC} - I_n$$

which give the following solutions:

$$I_{DC} = \frac{2CfE}{D}(R_n + 2R)$$

$$I_n = \frac{E}{D}(4CfR + 1)$$

Where:
$$D = R + R_n + 2CfRR_n$$

and
$$\Delta I = \frac{(2CfR_n - 1)E}{R + R_n + 2CfRR_n}$$

Therefore, $2CfR$ must approach zero for $\Delta I$ to be mathematically directly proportional to frequency, assuming that E is held constant. The above equations also indicate that there is a decrease in sensitivity as the frequency increases, as shown by the presence of a second order $f$ term in the denominator of the first derivative:

$$\Delta I/\delta f = \frac{2CER_n(2R+R_n)}{(R+R_n+2CfRR_n)2}$$

This would cause a pronounced non-linearity in response, and also cause the midfrequency null current to be over twice that called for by theory. The most convenient way to allow the term $2CfR$ to approach 0 is to make the value of R relatively low. The metering device normally has a resistance of approximately 1500 ohms. By using an impedance matching device, the effective resistance of R can be substantially reduced to approximately 50 ohms so that $\Delta I$ becomes substantially proportional to the frequency $f$ of the input signal $E_{AC}$. This impedance matching device may be a grounded base transistor stage. With this arrangement, not only is R reduced by a factor of 10, but R also decreases slightly with an increase in $\Delta I$ as the frequency $f$ increases and, thereby, the desensitizing effect of R partially counteracts itself.

FIGURE 3 illustrates a specific frequency transducer circuit embodying this invention and operating on the basis of the above theory and mathematical calculations.

A line voltage whose frequency is to be monitored, for example a 400 cycle voltage, is applied to the primary winding 10 of transformer T. The signal appearing across secondary 12 is coupled through capacitor 14 to a bridge-type voltage limiting circuit designated generally by the reference numeral 16. Capacitor 2 and resistor 3 are placed across the secondary 12 to filter transient voltage changes from the input of the voltage limiter circuit 16. This voltage limiter has the effect of limiting the peak-to-peak voltage of the input signal to a constant value and providing a substantially flat top wave which is applied to capacitor 18. The amplitude of the current flowing through capacitor 18 is directly proportional to the frequency of the signal and is rectified by the full wave bridge-type rectifier designated generally by the reference numeral 20.

A bucking circuit 22 is connected across the bridge-type voltage limiter to provide a null current $I_n$ which is mixed in opposition with the rectified capacitor current $I_c$ in the bridge rectifier 20. Since $I_n$ is adjustable and is maintained smaller than $I_c$, a net difference current $\Delta I$ flows from the bridge rectifier through the emitter-base circuit of transistor 24. Transistor 24 is a grounded or common base transistor having substantially unity current gain and also having a low input impedance and a high output impedance. Capacitor 25 is connected across the emitter and base electrodes of the transistor to reduce ripple. The recorder 26 is connected to the output of the transistor through a sensitivity control potentiometer 28 having a variable tap 29 connected to the collector electrode 27 of transistor 24. Zero-suppressed operation and meter scale expansion may be effected by adjusting the value of the null current.

The secondary winding 30 of transformer T is connected to the rectifier comprising germanium diode 31 to provide suitable bias for rendering transistor 24 conductive when $\Delta I$ flows.

The circuit shown in FIGURE 3 will now be described in more detail. Voltage limiting circuit 16 comprises a pair of oppositely poled silicon diodes 36 and 38, each having one electrode connected to one side of the secondary winding 12 through coupling capacitor 14. The opposite electrodes of these diodes are connected to the opposite ends of a series circuit comprising a gas discharge voltage regulating diode tube 40 and a very small positive resistance 42. Gas diode tube 40 may be CBS type 6627 for 108 volt operation. This type has a positive internal impedance at all rated current levels and, therefore, there are no oscillation tendencies in the voltage limiter circuit 16. Also connected to opposite ends of the series circuit comprising gas diode 40 and resistance 42 is a pair of capacitors 44 and 46 having their other ends connected to the other side of the secondary 12. The voltage drop appearing across the series circuit comprising resistor 42 and gas diode 40 is maintained substantially constant at 108 volts.

Capacitors 44 and 46 maintain the fixed voltages against which the two silicon diodes, 36 and 38, work in providing the voltage limiting action. In the limiting process, the diodes act to charge the capacitors. The gas tube 40 acts to discharge them, and in so doing maintains the voltage difference between their terminals at the regulated value. The capacity of these two capacitors is set high enough that the amount of charging and discharging which takes place during each cycle will not cause an appreciable change of voltage. It can be seen from the foregoing that each capacitor will develop a voltage of approximately 54 volts, one positive with respect to the lower side of secondary 12 and the other negative. This has the effect of limiting or clamping the input signal to a peak-to-peak voltage amplitude of 108 volts.

The general shape of the input signal after limiting is indicated generally by the wave form 48 which is fed to the throttling capacitor 18. Capacitor 18 must be temperature stable, and have a very low temperature coefficient of capacity. A suitable device for capacitor 18 is a Tex-Cap type 22 Mylar capacitor made by the Texas Capacitor Co. of Houston, Texas. Mylar is a trademark of the du Pont Company for a polyester resin. The Tex-Cap type 22 Mylar capacitor is an especially developed wax impregnated Mylar, wherein the wax both physically stabilizes the capacitor, and also provides a compensating thermal coefficient against the Mylar's positive coefficient. The amptilude of the current flowing through capacitor 18 is directly proportional to the frequency of the signal voltage applied to primary 10 of transformer T since the wave form 48 is limited to a constant peak-to-peak value by voltage limiter 16. When the upper side of secondary 12 swings positive, this capacitor current $I_c$ flows towards the terminal 50 of bridge-type rectifier 20. When the lower side of secondary 12 swings positive, $I_c$ flows to point 56 of rectifier 20. The mixing of $I_c$ and $I_n$ in the bridge rectifier to derive $\Delta I$ will be described below.

The frequency detecting circuit or driving circuit consists of throttling capacitor 18 in series with bridge rectifier circuit 20 connected across bridge limiting circuit 16 between the limited output point and reference point. The bucking circuit 22, which functions in opposition to the frequency detecting circuit, comprises fixed resistors 62 and 64 and ganged variable resistors 66 and 67 connected in series via points 54 and 57 of the bridge rectifier circuit 20 and across the series circuit including the gas diode tube 40 and resistor 42 of bridge limiting circuit 16. It can be seen that the limiting circuit 16 performs a dual function in that it both limits the peak-to-peak amplitude of the input signal and provides a constant D.C. voltage source from which the constant-valued direct current $I_n$ is derived. With this arrangement, slight variations in the characteristics of commercially available gas diode tubes are unimportant since both the capacitor current $I_c$ and bucking current $I_n$ are derived from the voltage appearing across the tube.

It can be seen that two D.C. currents of opposite polarity appear at the output terminals 54 and 57 of the bridge rectifier 20. Current $I_c$ results from the rectifying action of the bridge rectifier 20 on the A.C. current through throttling capacitor 18. The magnitude of this current is a function of the frequency of input voltage. Current $I_n$ is applied to the output terminal 54 and 57 by virtue of the rectifying action of diodes 36 and 38.

This current, $I_n$, is of a constant magnitude because of the limiting action of limiter circuit 16. As may be seen from the indicated polarities of the diodes, the currents $I_c$ and $I_n$, oppose each other. A difference current $\Delta I$, which is the difference between $I_n$ and $I_c$, therefore is produced in the emitter-base circuit of transistor 24. Since in a common base circuit configuration, a transistor exhibits current gain which is essentially unity, a current which is essentially $\Delta I$ is caused to flow in the collector-base circuit of transistor 24. This $\Delta I$ collector current is applied to slider 29 of potentiometer 28. There $\Delta I$ divides with part flowing through recorder 26 to the positive terminal 63 of the collector bias supply and the other part flowing through resistor 88, potentiometer 86 and resistor 87 to the positive terminal 63 of the collector bias supply. (The collector bias supply is composed of secondary winding 30 of transformer T, diode 31 and capacitor 84.) Resistors 87 and 88 and potentiometer 86 comprises a desensitizing circuit. The function of the desensitizing circuit is to develop a small voltage across resistor 87 and a portion of potentiometer 86, which tends to increase the fraction of $\Delta I$ which bypasses the recorder 26. Potentiometer 28 functions as a current divider, and thus acts as a sensitivity control for varying the response of recorder 26 by controlling the fraction of direct current $\Delta I$ which flows through the recorder 26.

Secondary winding 30 of transformer T in conjunction with germanium diode 31, supplies the proper base-collector bias to the transistor 24. In order to keep the current through transistor 24 above the minimum required for the operation of that transistor, a small, constant "keep-alive" current, which is a negligible part of the collector current of transistor 24, is provided through resistor 78. Capacitor 84 acts to smooth the bias voltage and increase its D.C. value. Potentiometer 86 acts as a voltage desensitizing adjustment, and is set to provide no variation in recorder current with variations in the signal voltage appearing across secondary winding 12 of transformer T. The following more clearly describes the voltage desensitizing circuit. As noted above, secondary 30, diode 33, and the resistances associated with potentiometer 86 serve to form a direct voltage supply, the magnitude of which is proportional to the input voltage. This voltage is not filtered since the small amount of pulsating effect it will eventually have on the recorder is considered to be beneficial rather than otherwise, due to its reduction of the pen friction effect. It will be noted that this voltage is generated negative at terminal 73 or 63, and positive at the slider of potentiometer 86. The effect of this voltage may be considered in either of two ways. In one way, it forces a component of current through resistor 88, through potentiometer 28, and through recorder 26. In the other way of considering it, it acts to reinforce that portion of $\Delta I$ which goes through resistance 88, thus causing a smaller fraction of $\Delta I$ to go through meter 26. It perhaps should be pointed out that the function of this effect is only to eliminate that small variation in output from the frequency sensing circuit which escapes limitation by the initial voltage limiting effects in the area of bridge limiting circuit 16.

Resistors 62 and 64 connected in series in bucking circuit 22 serve to limit the value of null current $I_n$. Variable resistors 66 and 67 are used for adjusting to zero the direct current flowing through recorder 26 for a predetermined frequency of the input signal at transformer T.

The circuit also includes an interference filter consisting of a resistor 3, in series with secondary 12, and a capacitor 2 across the secondary 12. This interference filter is desirable to filter out spikes and sharp transients in the signal whose frequency is to be measured.

A set of specific values for the elements of the circuit just described will be presented, but it is to be understood that these values are not limiting on the invention, and that other elements could be used to obtain similar results while still remaining within the scope of this invention.

Transformer T is rated at 115 volts on primary winding 10, 115 volts on secondary winding 12, and 12 volts on secondary winding 30, each at 100 ma. R.M.S. and 45–450 cps. The design of the equipment is such that it will operate without change with a voltage output from secondary 12 over the range of from about 80 volts to about 130 volts. Capacitor 2 has a value of 2 mfd. and resistor 3 has a resistance of 47 ohms. Diodes 36 and 38 are silicon diodes having a high peak inverse voltage and a low forward impedance. Silicon diodes 52, 58, 68 and 69 are used in bridge rectifier 20. Germanium diodes 31 and 33 are used in the collector supply circuit for low initial drop, since the higher forward impedance is not critical in this use.

Gas diode tube 40 is CBS type 6627, and provides a 108 volt peak-to-peak trapezoidal wave across capacitor 18 in a very stable manner. The tube has positive resistance to minimize an oscillation tendency when connected across capacitors 44 and 46 in the voltage limiter bridge 16.

Transistor 24 is a 2N147 made by Texas Instruments Incorporated of Dallas, Texas, and presents a very low 40 ohm load across the smoothing capacitor 25, and has almost a 1:1 current gain.

The frequency sensitive throttling capacitor 18 has a value of 0.12 mfd. at the operating frequency of 400 cps. plus or minus 25 cps., and is of the type described previously. Capacitors 44 and 46 are rated at 50 mfd. and 150 volts each. Capacitor 25 is rated at 200 mfd. and only 3 volts, since the maximum voltage across it will be .15 volt, and the high capacity is effective in reducing ripple. Capacitor 25 is used so that a false load will not be seen by the voltage through capacitor 18, since this would drastically reduce sensitivity.

Capacitor 84 is not critical, and is rated at 25 mfds. and 25 volts. Coupling capacitor 14 is rated at 0.15 microfarad and 400 volts. A 2200 ohm, 20 watt resistor may be substituted for capacitor 14; however, the use of capacitor 14 is preferred.

Resistors 62 and 64 have a value of 5600 ohms plus or minus 1%, and are rated at one-half watt. Each of the resistors 66 and 67 has a value of 1000 ohms, and serves to adjust the null current for about a net .7 ma. $\Delta I$ difference current flowing through the emitter of transistor 24 at 400 cps. Resistors 66 and 67 can be combined if desired. Resistor 78 has a value of 100 K, and provides about .3 ma. suppression on the output at the collector of transistor 24. Potentiometer 28 has a resistance of 5000 ohms and acts as a sensitivity control. Potentiometer 86 has a resistance of 100 ohms, and resistor 87 of 150 ohms. Resistor 88 has a value of 18 K and one-half watt rating.

This frequency transducer finds particular utility as a line frequency monitor in which it is desired to indicate or record variations in line frequency over a narrow range. For example, in the case just described, the null current $I_n$ is adjusted so as to provide a zero indication on recorder 26 when the line frequency is equal to 375 cps. However, variations above this frequency cause proportionally different direct currents to flow through the recorder to indicate the variations.

While only one specific embodiment has been described, it is to be understood that various omissions, substitutions, additions, and other modifications may be made herein without departing from the scope of this invention which is limited only as defined in the appended claims.

What is claimed is:

1. A frequency transducer comprising a signal input circuit, a bridge circuit having a first junction of a pair of oppositely poled diodes, a second junction of a pair of capacitors, a third junction coupling together one of said diodes and one of said capacitors and a fourth junction coupling together the other of said diodes and the other of said capacitors, said third and fourth junctions being shunted by a series circuit of a gas diode and a resistor, said first junction and said second junction coupled across said input circuit, said bridge circuit limiting the peak level of the signal applied to said input circuit and providing a direct current reference level clamped at said peak level, a translating means having a low input impedance and a high output impedance, a reactive circuit coupling the signal limited by said bridge circuit to said translating means, and means coupling at least a portion of said reference level to said reactive circuit to oppose the signal applied thereto.

2. The frequency transducer of claim 1 wherein the translating means is a transistor and the reactive circuit comprises a capacitor input bridge rectifier.

References Cited by the Examiner

UNITED STATES PATENTS

| | | | |
|---|---|---|---|
| 2,079,485 | 5/1937 | Bousman | 324—132 X |
| 2,915,648 | 12/1959 | Chudleigh et al. | |
| 2,934,703 | 4/1960 | Cohen | 324—78 X |

FOREIGN PATENTS 723,990  2/1955  Great Britain.

WALTER L. CARLSON, *Primary Examiner.*